(No Model.)

H. L. KINGSLEY.
VEHICLE POLE.

No. 503,605. Patented Aug. 22, 1893.

Witnesses.
Geo. W. Loomy
J. W. Swenberger

Inventor
Horace L. Kingsley,
By H. G. Underwood.
Attorney

UNITED STATES PATENT OFFICE.

HORACE L. KINGSLEY, OF RACINE, WISCONSIN.

VEHICLE-POLE.

SPECIFICATION forming part of Letters Patent No. 503,605, dated August 22, 1893.

Application filed May 18, 1893. Serial No. 474,625. (No model.)

*To all whom it may concern:*

Be it known that I, HORACE L. KINGSLEY, a citizen of the United States, and a resident of Racine, in the county of Racine, and in the State of Wisconsin, have invented certain new and useful Improvements in Vehicle-Poles; and I do hereby declare that the following is a full, clear, and exact description thereof.

My invention relates to vehicle poles, and it consists in certain peculiarities of construction and combinations of parts as will be fully set forth hereinafter, and subsequently claimed.

Figure 1:
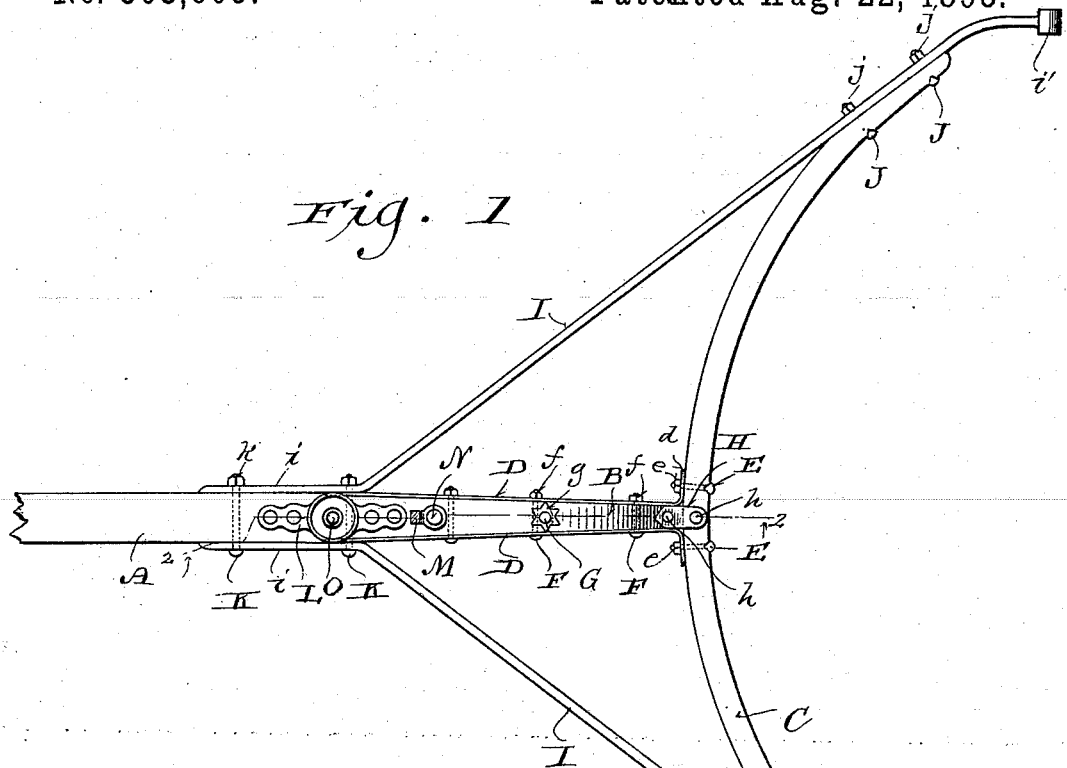
Figure 2:
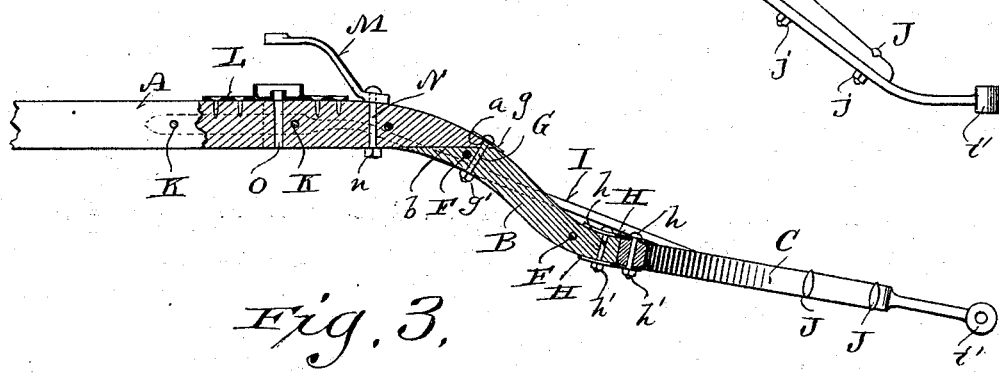
Figure 3:
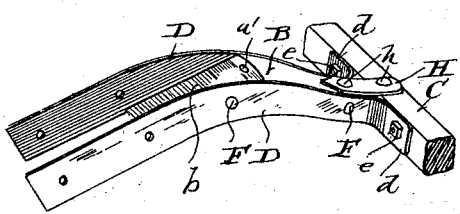

In the drawings: Figure 1 is a plan view of my improved device. Fig. 2 is a side elevation, partly in section on the line 2—2 of Fig. 1. Fig. 3 is a detail perspective view of a portion of the device.

The object of my present invention is to construct a vehicle pole to take the place of the wooden poles with the bent rear ends, and which shall be equally strong and serviceable, and of less cost to manufacture.

A represents the straight portion of my pole, having a flat under surface at its rear end, with the upper rear surface curved or rounded down to a point, as shown at $a$, in Fig. 2.

B represents the rear end of my pole, of the shape shown in Fig. 2, that is, of a general ogee-shape, but with a flattened upper end, $b$, to correspond with the described flat under surface of the rear end of the part A of said pole. This part B is not bent, but is sawed or cut out the required shape.

C is the circle-bar, of ordinary construction.

D D are metallic side plates, conforming in shape to that of the rear portion of the pole A B and having bent rear ends $d\, d$, secured to the circle bar, as by T-bolts E E and nuts $e\, e$ and to the part B of the pole by bolts F F and nuts $f\, f$.

The described side plates D D in conjunction with the flattened top $b$ of the part B, form a socket for the reduced or rounded rear end of the part A of the pole, and when the parts A and B are put together in place, a bolt G is driven through a hole in the point $a$ of the part A and a corresponding hole $a'$ in the part B, there being a washer $g$ on top of the pole beneath the head of said bolt, this washer (which may be of star shape, as shown, or other ornamental form) concealing the line of juncture of said parts A and B, and strengthening and protecting the pole at this point, and the bolt being secured by a nut $g'$.

H H are short metallic plates above and below the line of juncture of the rear end of the part B of the pole and the circle bar C, bolts $h\, h$ passing through said plates and through the said parts B and C, respectively, and being secured in place by nuts $h'\, h'$ on the under side.

I I are metallic braces, having forward ends $i\, i$ parallel with the part A of the pole (said part A being reduced slightly to receive the side-plates D D so that the same may come flush with the side edges of the forward part of said pole) said ends $i\, i$ being secured to the pole A by transverse bolts K K and nuts $k\, k$, and then, just back of the forward ends of the side-plates D D these braces I I are bent obliquely outward, but in a straight line, to a point just beyond the ends of the circle-bar C, said bar ends being squared off, on the front side, to receive said braces, and united thereto by T-bolts J J and nuts $j\, j$ and beyond the said circle-bar C the rear ends of these braces I I are bent inward, in a practically straight line, and terminate in pole or shaft eyes $i'\, i'$ to receive the ordinary shackles on the vehicle axle.

L shows the plate, and M (in Fig. 2) the upright arm, on the part A of the pole for the doubletrees, the said arm being secured by a bolt N and nut $n$, the arm being broken away in Fig. 1, to better show the said plate, and the pole A is provided with a vertical opening O for the doubletree pin.

My vehicle-pole thus constructed is not only cheaper than the bent-wood pole, but if anything stronger, and neater in appearance.

Having thus described my invention, what I claim as new, and desire to secure by Letters Patent, is—

1. In a vehicle-pole, the combination of a straight forward wooden portion terminating in a flat under rear surface and having the upper rear surface curved or rounded down to a point, and a rear wooden portion of ogee-shape, flattened at its upper end to correspond with the flat under rear surface of said forward portion, with metallic side plates, and bolts passing through said wooden parts and said side plates substantially as set forth.

2. In a vehicle pole, the combination of a straight forward wooden portion terminating in a flat under rear surface and having the upper rear surface curved or rounded down to a point, and a rear wooden portion of ogee-shape, flattened at its upper end to correspond with the flat under rear surface of said forward portion, with a washer, covering and protecting the upper line of juncture of the said two portions, and a bolt passing through said washer, and through the rear end of the forward portion and the upper end of the rear portion of said pole, substantially as set forth.

3. In a vehicle pole, the combination of a straight forward wooden portion, and an ogee-shaped rear wooden portion, with a circle bar, metallic side plates covering the side edges of the ogee-shaped rear portion and forming a socket for the rear end of the forward portion, and secured by transverse bolts to both the forward and rear portions and having bent ends secured to the said circle-bar, a washer covering the upper line of juncture of the said forward and rear portions, and a bolt passing through said washer and through said two portions, substantially as set forth.

4. In a vehicle pole, the combination of a straight forward wooden portion and an ogee-shaped rear wooden portion, a washer covering their point of juncture and a bolt passing through said washer and through said two portions and uniting them at this point, with a circle-bar, metallic side-plates secured to said circle-bar and to said forward and rear portions of the pole, and straight oblique metallic braces secured to the forward portion of the pole and to the ends of the circle-bar, and terminating in pole-eyes, substantially as set forth.

In testimony that I claim the foregoing I have hereunto set my hand, at Racine, in the county of Racine and State of Wisconsin, in the presence of two witnesses.

HORACE L. KINGSLEY.

Witnesses:
　WALTER C. PALMER,
　C. C. GITTINGS.